United States Patent [19]

Decker, III et al.

[11] Patent Number: 5,437,924
[45] Date of Patent: Aug. 1, 1995

[54] COMPOSTABLE, BIODEGRADABLE FOAM CORE BOARD

[75] Inventors: William C. Decker, III, Cary, N.C.; William A. Wittosch, Jr., Warwick, N.Y.

[73] Assignee: International Paper Company, Purchase, N.Y.

[21] Appl. No.: 90,221

[22] Filed: Jul. 8, 1993

[51] Int. Cl.⁶ ............................ B32B 3/26; B32B 5/14
[52] U.S. Cl. ............................ 428/318.4; 428/304.4; 428/308.4; 428/319.1; 521/56; 521/79; 521/141; 521/916
[58] Field of Search ............... 428/304.4, 308.4, 318.4, 428/319.1; 521/141, 916, 56, 79

[56] References Cited

U.S. PATENT DOCUMENTS

| | | | |
|---|---|---|---|
| 3,415,714 | 12/1968 | Hider | 428/317.5 |
| 3,551,243 | 12/1970 | Schuur et al. | 156/244.14 |
| 3,673,125 | 6/1972 | Takahashi et al. | 260/2.5 F |
| 3,778,390 | 12/1973 | Ulrich | 260/2.5 AN |
| 4,049,592 | 9/1977 | Maans et al. | 260/2.5 AD |
| 4,132,839 | 1/1979 | Marans et al. | 521/159 |
| 4,276,339 | 6/1981 | Stoveken | 428/153 |
| 4,591,475 | 5/1986 | Tomka et al. | 264/328.14 |
| 4,655,840 | 4/1987 | Wittwer et al. | 106/126 |
| 4,673,438 | 6/1987 | Wittwer et al. | 106/126 |
| 4,790,881 | 12/1988 | Wittwer et al. | 106/189 |
| 4,863,655 | 9/1989 | Lacourse et al. | 264/53 |
| 4,900,361 | 2/1990 | Sachetto et al. | 106/213 |
| 5,052,578 | 10/1991 | Goodwin | 220/352 |
| 5,089,535 | 2/1992 | Malwitz et al. | 521/141 |
| 5,095,054 | 3/1992 | Malwitz et al. | 521/141 |
| 5,110,838 | 5/1992 | Tokiwa et al. | 521/81 |
| 5,116,550 | 5/1992 | Perkins | 264/12 |
| 5,116,880 | 5/1992 | Tokiwa et al. | 521/134 |
| 5,134,171 | 7/1992 | Hammel et al. | 521/98 |
| 5,252,271 | 10/1993 | Jeffs | 264/54 |
| 5,272,181 | 12/1993 | Boehmer et al. | 521/84.1 |

OTHER PUBLICATIONS

Reedy International Corporation, "SAFOAM-The Chemical Nucleating and Blowing Agent of the Future- Product Range", 1 page.
Reedy International Corporation, "SAFOAM RIC-50 Specification Sheet", 1 page.
Reedy, Michael E., "Material Safety Data Sheet", pp. 1–4, Jan. 4, 1991, Keyport, N.J.
Karen F. Lindsay, "'Truly Degradable' Resins are Truly Commercial", Modern Plastics, Feb. 1992.
Laurie McCarthy-Bates, "Biodegradables Blossom into Field of Dreams for Packages", *Plastic World*, pp. 22–27, Mar. 1993.
Reedy International Corporation, "Suggested Running Procedures For SAFOAM Polyethylene Masterbatches in Extrusion", 1 page.

*Primary Examiner*—Daniel R. Zirker
*Attorney, Agent, or Firm*—Ostrager, Chong & Flaherty

[57] ABSTRACT

A compostable, biodegradable foam core board has a facing sheet adhered to a foam core sheet made of a foamable biodegradable material selected from a polyvinyl alcohol polymer, a starch-based thermoplastic polymer, a polylactic acid polymer, and other foamable, biodegradable polymers having structural rigidity when foamed. The foam core sheet has selected structural properties including a foam core weight in a preferred range of 30 to 50 lbs/msf, a foam density in a preferred range of 1.5 to 9 lbs/ft³, and a foam cell size in a preferred range of 0.30 to 0.70 mm. In one example, the foam core material is composed of a mixture of a polyvinyl alcohol polymer and high-melt-index polystyrene as a structural polymer additive. In another preferred example, the foam core material contains a blend of destructurized starch, polyethylene, polyvinyl alcohol, polyvinyl acetate, and glycerol as a plasticizer.

5 Claims, 1 Drawing Sheet

COMPOSTABLE, BIODEGRADABLE FOAM CORE BOARD

FIELD OF THE INVENTION

This invention generally relates to a compostable, biodegradable foam core board, and more particularly, to such foam core board having improved properties of rigidity, structural integrity, and ease and low cost of manufacture.

1. Background of the Invention

Conventional foam core board, such as used for art board, signage, and display board, is typically a laminated structure comprised of a paperboard facing adhered to a polystyrene foam core. Such conventional foam core board is sold, for example, under the brand name GATORFOAM TM by the Masonite Division of International Paper Company, located in Raleigh, N.C. In the solid waste stream, these are "high bulk" materials that do not degrade readily in a landfill nor can they be recycled with conventional technology. Although some biodegradable foam materials are known, they are not recognized in the industry as being suitable for use in foam core board.

1. Summary of the Invention

Accordingly, it is a principal object of the present invention to provide a foam core board that would degrade and/or be compostable, recyclable, or otherwise offer waste source reduction advantages that would be more environmentally acceptable than conventional polystyrene foam core boards. It is a particular object that such compostable, biodegradable foam core board have good rigidity and structural integrity for its conventional uses for art board, signage, and display board, and also be easy and inexpensive to manufacture.

In accordance with the present invention, a compostable, biodegradable foam core board comprises a facing sheet adhered to a foam core sheet made of a foamable, bio-degradable material selected from the group comprising a polyvinyl alcohol polymer, a starchbased thermoplastic polymer, a polylactic acid polymer, and other foamable, bio-degradable polymers having structural rigidity when foamed.

The foam core sheet has selected structural properties including a foam core weight of about 25 to 80 lbs/msf, preferably in a desired range of 30 to 50 lbs/msf, a foam density of about 1.5 to 15 lbs/ft$^3$, preferably in a desired range of 2.0 to 9 lbs/ft$^3$, and a foam cell size of about 0.20 to 1.24 mm, preferably in a desired range of 0.30 to 0.70 mm.

Other objects, features, and advantages of the present invention will become apparent from the following detailed description explained with reference to the drawings, of which:

DETAILED DESCRIPTION OF THE INVENTION

Figure 1:
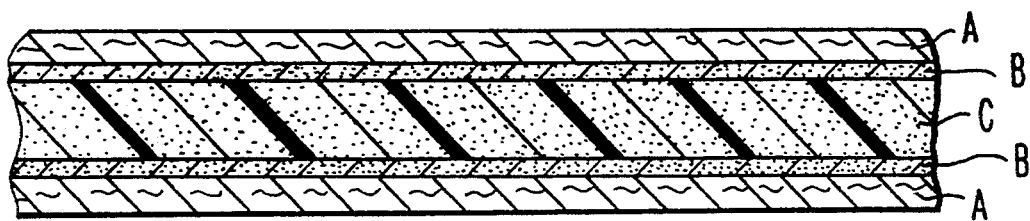
FIG. 1 is a sectional side view showing a foam core board in accordance with the present invention having a facing sheet adhered to a foam core sheet by an adhesive layer.

The properties of conventional foam core board are well known in the industry. For example, the GATORFOAM TM board manufactured by the Masonite Division of International Paper Company is a heavy-duty "sandwich" board with a foam center and hard veneer outer surfaces, sold in 3/16, ½, ¾, 1, and 1½ inch thicknesses. The foam core is made of a white, high-density Styrofoam TM material from Dow Chemical Corp. The surface facing is a resin-impregnated bleached white kraft paper sold under the name Luxcell TM veneer from International Paper Company. The foam board has excellent properties for application of inks, paints, panel glues, and hot melt formulations, as well as suitability for cutting, mounting, and weather resistance. It has good rigidity and structural properties, of which the following are representative:

TABLE I

| | |
|---|---|
| Panel Thickness: | 0.210 inch |
| Panel Weight: | 275 lbs/msf |
| Panel Density: | 15 lbs/ft$^3$ |
| Foam Thickness: | 0.160 inch |
| Foam Weight: | 29 lbs/msf |
| Foam Density: | 2.1 lbs/ft$^3$ |
| Facing Thickness: | 0.025 inch |
| Facing Weight: | 110 lbs/msf |
| Modulus of Rupture: | 3,000 psi |
| Modulus of Elasticity: | 226,000 psi |
| Compression Strength: | 35 psi (to 10% compression) |
| Internal Bond Strength: | 90 psi (to foam failure) |

A biodegradable/compostable material can be defined as one which when exposed to suitable conditions is capable of being decomposed by microorganisms or available chemicals to carbon dioxide, water, and environmentally innocuous materials. A "foam" material is a solid plastic material having an expanded cellular construction. Biodegradable foam materials are known in the industry for other uses, but heretofore have not been developed for use in foam core board. In the present invention, biodegradable foam materials are selected and adapted for use in foam core board based upon their having desirable structural properties, suitability for easy and inexpensive manufacture, and susceptability to decomposition or other recycling from solid waste. The criteria for foam core physical properties suitable for purposes of the present invention were as follows:

Foam Weight: 25 to 80 lbs/msf; preferred range, 30 to 50 lbs/msf.

Foam Density: 1.5 to 15 lbs/ft$^3$; preferred range, 2.0 to 9 lbs/ft$^3$.

Foam Cell Size: 0.20 to 1.24 mm; preferred range, 0.30 to 0.70 mm.

Forming: capable of conventional foaming and sheet extrusion or injection molding.

Laminate: capable of forming good bond with environmentally benign adhesive, or contact bonding with extrusion or molding.

Dissolvability: at least partially water soluble to diminshed form.

Dissolved Residue: environmentally benign, diluent polymers.

Based upon the above criteria for physical properties, a biodegradable material found to be suitable for foam core board is a thermoplastic composition of polyvinyl alcohol (PVA) material combined with other, structural polymers and processed with selected blowing and forming agents so as to have the desired structural, forming, and decomposition properties. Thermoplastic compositions for water soluble foams are disclosed, for example, in U.S. Pat. No. 5,089,535, issued in the names of Nelson E. Malwitz and Shau-Tarng Lee, and assigned to Sealed Air Corporation, of Saddle Brook, N.J., which is incorporated herein by reference.

Suitable thermoplastic compositions as mentioned in that patent comprise a resin mixture containing polyvinyl alcohol material, an optional diluent polymer selected for added structural properties, and optional additives such as nucleating agents, aging modifiers and ionomer resins, and a volatile blowing agent. Suitable polyvinyl alcohol materials include copolymers of vinyl alcohol and internal plasticizers. Commercially available examples of polyvinyl alcohol materials include a Variety of internally plasticized polyvinyl alcohol plastics from Air Products and Chemicals, Inc., of Allentown, Pa., under the trade name Vinex TM . A preferred resin is Vinex TM 2025, which is a high melt index (MI=17) PVOH blend.

Diluent polymers compatible with polyvinyl alcohol are blended into the thermoplastic resin mixture to provide structural properties in the extruded foam. Suitable diluent polymers include aryl and olefinic polymers. Examples of aryl polymers include polystyrene, substituted derivatives, and copolymers thereof. Examples of olefinic polymers include polyethylene, polypropylene, substituted derivatives, and copolymers thereof. A particularly suitable diluent polymer is a high-melt-index polystyrene available under the name Huntsman 203 from Huntsman Chemical Corp. which will produce a stiff and rigid foam having good structural properties for foam core board. Although the diluent polymers may not be as readily biodegradable, they are needed in comparatively smaller amounts than the polyvinyl alcohol, and therefore a significant solid waste reduction is nevertheless obtained by the overall resin mixture.

Preferred blowing agents for the polyvinyl alcohol resin mixture include low molecular weight alcohols, such as those with a boiling point between 46° C. and 100° C. (at standard temperature and pressure). Examples of such blowing agents include methanol, ethanol, propanol, and butanol. Other preferred blowing agents include endothermic blowing agents, such as those available from Reedy International Corp., of Keyport, N.J. These materials include sodium salts of carbonic, polycarbonic, polycarboxylic acids and carbonate compounds belonging to the chemical family of aliphatic acids and carbonates.

EXAMPLE 1

A specific example will now be described with reference to the two-sided foam core board structure illustrated in FIG. 1. A foam core sheet "C" produced by extrusion was obtained from Sealed Air Corp. containing Vinex TM polyvinyl alcohol material from Air Products Co. and a high-melt-index diluent polymer. The foam core sheet "C" was adhesively bonded to top and bottom facing sheets "A", which were 18-point Val-U-Cote198 uncoated=paperboard obtained from International Paper Company. The adhesive layers "B" were made of a latex binder such as one sold under the designation AIRFLEX TM 400 Latex Binder from Air Products Co. A slight pressure was applied to the "sandwich" structure until the adhesive bonding was set. The samples had an approximate total thickness of 3/16 to ¼ inch.

As a decomposition test, the samples were placed in a mechanical stirrer with water for about 15 seconds. The foam core was found to be completely broken up and dissolved, and the paperboard was reduced to fiber. Small clumps of residue material and undigested fiber were visible.

Another suitable biodegradable material for foam core board is foam created from polymer compositions containing destructurized starch. Starch-based resin compositions for water soluble foams are disclosed, for example, in U.S. Pat. No. 5,095,054 issued in the names of Gustav Lay et al., and assigned to Warner-Lambert Company, of Morris Plains, N.J., which is incorporated herein by reference. Suitable starch-based resin compositions are available from Novon Products Division of Warner-Lambert Company under the names Novon Type R0323 and R0351, and contain a blend of starch, polyethylene, polyvinyl alcohol, polyvinyl acetate, and glycerol as a plasticizer. These starch-based resin mixtures use water as a blowing agent where polystyrene is added as a diluent polymer. Polyethylene, polypropylene or other aryl polymers or olefinic polymers, derivatives, or copolymers thereof can be used as the diluent polymers. Other blowing agents, such as endothermic blowing agents from Reedy International Corp., or low molecular weight alcohols, atmospheric gases, hydrocarbons, or halogenated hydrocarbons may also be used.

EXAMPLE 2

An example of the starch-based resin foam core will now be described with reference to the two-sided foam core board structure illustrated in FIG. 1. Samples were produced having foam core sheets "C" produced by extrusion of foam containing Novon Type R0323 and R0351 starch-based resin compositions from Novon Products Division of Warner-Lambert Company, using Safoam TM RIC-50 endothermic blowing agent from Reedy International Corp. A slot die of "coathanger" design was used with the extruder to obtain foam core thicknesses of about 1/16 to ⅛ inch. Different combinations of surface facings "A" were tested: (a) both sides faced with bleached paperboard having a thickness of 0.010 to 0.025 inch; (b) both sides faced with resin saturated bleached paperboard with a thickness of 0.010 to 0.025 inch; (c) one side faced with unbleached paperboard and the opposite side faced with unbleached kraft board with a thickness of 0.010 to 0.050 inch; (d) one or both sides faced with a white-clay-coated board with a thickness of 0.010 to 0.025 inch; (e) one or both sides faced with a white-clay-coated board with a thickness of 0.010 to 0.065 inch; (f) variations including colored facing sheets; (g) variations including recycled paper or paperboard. The samples were laminated using Airflex TM 421 self-catalyzing polyvinyl acetate water-based adhesive from Air Products Co. roller-coated as the adhesive layers "B", and pressed in a Pasedena press at 5–20 psi heated to 150°–175° F. with a residence time of 2 to 4 minutes.

The samples were found to have good facing-to-core bonding. In decomposition tests, the samples were found to be well broken up by mechanical stirring and dissolved by immersion in water after a short time, and the paperboard was reduced to fiber. Small clumps of residue material and undigested fiber remained.

Other foamable biodegradable polymers may be used to form a biodegradable foam core board. In particular, polylactic acid polymers are capable of forming sheets by common extrusion methods, and have good decomposition properties in a suitable environment. Such polylactic acid polymers for degradable resins are obtainable, for example, from Cargill Corp., of Minneapolis, Minn. The principal requirement for use as foam core board is that the foam material be selected and combined with suitable additives of diluent polymers and other blowing and forming agents so as to have sufficient structural rigidity when formed. Other foamable degradable polymers include, but are not limited to, hydroxy buterate valerate, polyethylene oxide blends, polycaprolactone, and blends of these materials with other diluent polymers.

Figure 2:
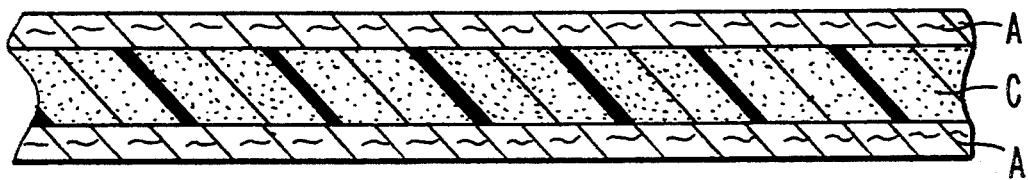
FIG. 2 is a sectional side view showing another embodiment of a foam core board of the present invention having a facing sheet adhered in contact with an extruded foam core sheet.

The foam core board laminate may also be formed in other ways besides roller-coated water-based adhesives. Paper adhesives, adhesives made of the same materials as the foam core materials, and other suitable bonding adhesives may also be used. The press for press-bonding the layers together can be thermally and mechanically controlled to obtain the desired bonding between the foam core and facings and to maintain composite thickness control. The foam core may also be thermally bonded to the facings by melting the surfaces of the foam core at the point of contact with the facing material at the entrance to a continuous press. A heat-activated adhesive could instead be pre-applied to the foam-contacting side of the facing material and then mated with the foam core. The lamination step can be done in continuous fashion from pre-extruded supply rolls of the foam core and facing sheets, or in batch processing with cut sheets. Alternatively, the molten foam sheet may be directly extruded between the two facing layers at the entrance to a continuous press. This alternative is illustrated in FIG. 2 having the foam core sheet "C" contact bonded directly to the facing sheets "A".

The facing material is not limited to paper or paperboard, but may also be other surfacing or support materials, such as wood, metal, polymer sheets or films, or laminate structures.

Numerous modifications and variations are of course possible given the above disclosure of the broad principles and best mode of carrying out the invention. It is intended that all such modifications and variations be considered as within the spirit and scope of the invention, as defined in the following claims.

We claim:

1. A compostable, biodegradable foam core board comprising:
   a foam core sheet made of a mixture of:
   (a) a foamable, biodegradable material which is a polymer composition containing destructurized starch and includes a blend of starch, polyethylene, polyvinyl alcohol, polyvinyl acetate, and glycerol as a plasticizer,
   (b) a diluent polymer selected from the group consisting of aryl polymers, olefinic polymers, derivatives, and copolymers thereof, and
   (c) a blowing agent selected from the group consisting of a low molecular weight alcohol, an endothermic blowing agent, air, water, a hydrocarbon or halogenated hydrocarbon, and
   a facing sheet adhered to at least one side of said foam core sheet, said facing sheet being made of a material selected from the group consisting of paper, paperboard, wood, metal and a polymer sheet or film,
   wherein said combination of foamable, biodegradable material, diluent polymer, and blowing agent are selected such that a foam core sheet of sufficient structural rigidity for a foam core board is formed, and wherein said foam core sheet has selected structural properties including a foam core weight of about 25 to 80 lbs/msf, a foam density of about 1.5 to 15 lbs/ft$^3$, and a foam cell size of about 0.20 to 1.24 mm.

2. A compostable, biodegradable foam core board according to claim 1, wherein said foam core sheet is adhesively bonded to top and bottom facing sheets.

3. A compostable, biodegradable foam core board according to claim 1, wherein said foam core sheet is thermally bonded to the facing sheet.

4. A compostable, biodegradable foam core board according to claim 1, wherein said foam core sheet is bonded to said facing sheet by direct extrusion in contact with the facing sheet.

5. A compostable, biodegradable foam core board comprising:
   a foam core sheet made of a mixture of:
   (a) a foamable, biodegradable material which is a polylactic acid polymer, copolymer or derivative thereof,
   (b) a diluent polymer selected from the group consisting of aryl polymers, olefinic polymers, derivatives, and copolymers thereof, and
   (c) a blowing Agent selected from the group consisting of a low molecular weight alcohol, an endothermic blowing agent, air, water, a hydrocarbon or halogenated hydrocarbon, and
   a facing sheet adhered to at least one side of said foam core sheet, said facing sheet being made of a material selected from the group consisting of paper, paperboard, wood, metal and a polymer sheet or film,
   wherein said combination of foamable, biodegradable material, diluent polymer, and blowing agent are selected such that a foam core sheet of sufficient structural rigidity for a foam core board is formed, and wherein said foam core sheet has selected structural properties including a foam core weight of about 25 to 80 lbs/msf, a foam density of about 1.5 to 15 lbs/ft$^3$, and a foam cell size of about 0.20 to 1.24 mm.

* * * * *